United States Patent [19]

Fukushima et al.

[11] 4,378,993
[45] Apr. 5, 1983

[54] METHOD AND APPARATUS FOR MEASURING HEIGHT LEVEL OF MELTING ZONE IN BLAST FURNACE

[75] Inventors: Tsutomu Fukushima; Takeshi Furukawa; Shin-ichi Saito, all of Yokohama; Takashi Kobayashi, Yoyogimachi; Takeo Yamada, Yokohama, all of Japan

[73] Assignee: Nippon Kokan Kabushiki Kaisha, Tokyo, Japan

[21] Appl. No.: 204,843

[22] Filed: Nov. 7, 1980

[30] Foreign Application Priority Data

Nov. 9, 1979 [JP] Japan .................................. 54-144332

[51] Int. Cl.³ ............................................. C21B 5/00
[52] U.S. Cl. ........................................... 75/41; 266/44; 266/92; 324/58.5 B
[58] Field of Search ..................... 266/44, 92; 75/41; 324/58.5 B

[56] References Cited

U.S. PATENT DOCUMENTS 4,094,494 6/1978 Mahr ....................................... 266/92
4,269,397 5/1981 Strimple et al. ....................... 266/44

Primary Examiner—M. J. Andrews
Attorney, Agent, or Firm—Joseph W. Molasky & Assoc.

[57] ABSTRACT

A desired number of cables are drawn, along with the falling charge, into a blast furnace from its top and the forward ends of the cables are melted upon reaching the melting zone in the furnace. The length of each of the cables to its melted end is measured in accordance with the result of a voltage pulse response measurement utilizing the distributed constant circuit characteristics of the cable, and the height level of the melting zone inside the furnace is measured from the cable length by correcting it for the amount of deflection of the cable within the furnace. By measuring the cable length at each of a plurality of radial locations of the furnace, it is possible to estimate the three-dimensional shape of the upper boundary of the melting zone with a high degree of accuracy.

8 Claims, 23 Drawing Figures

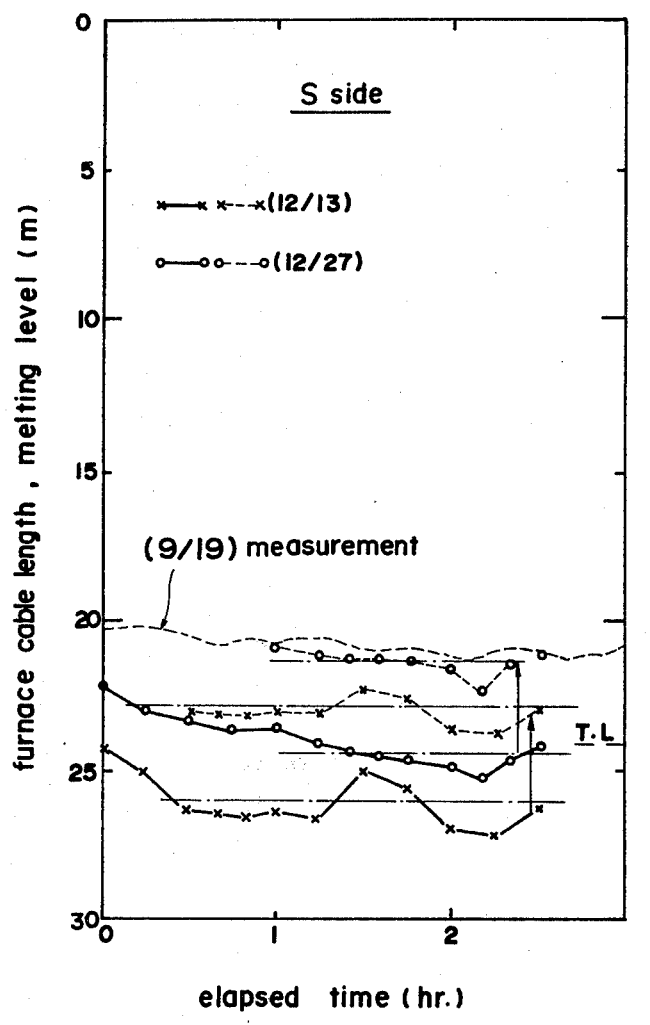

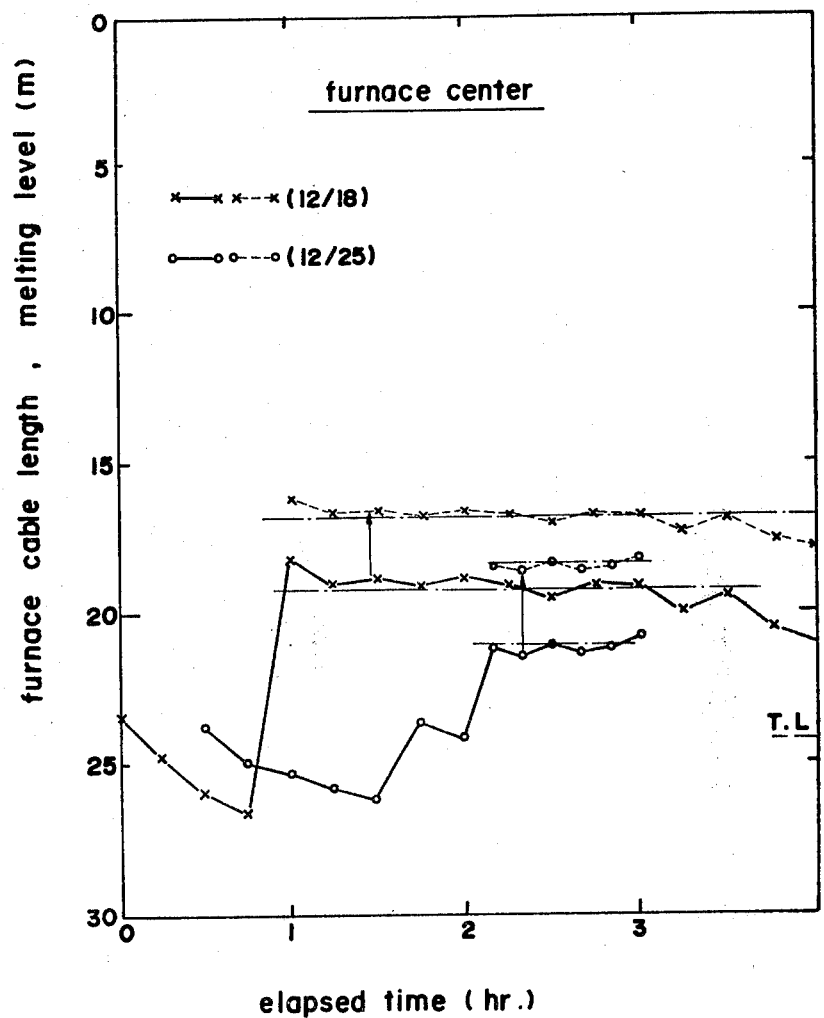

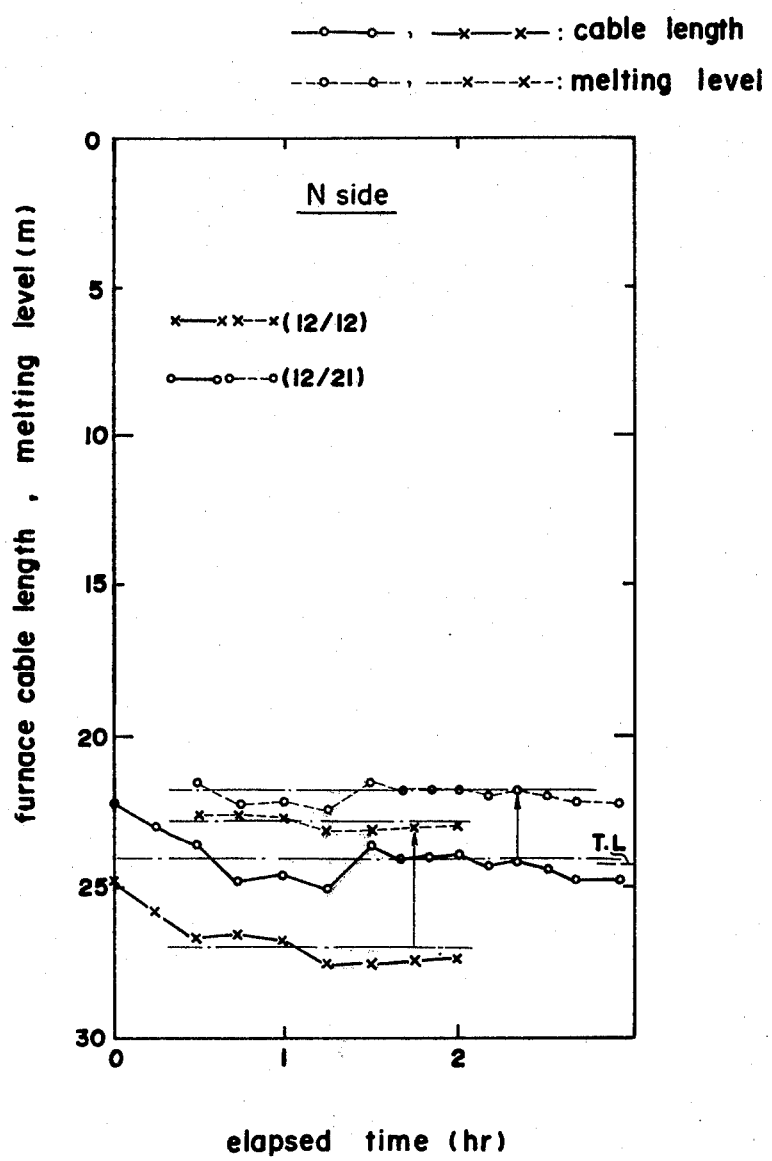

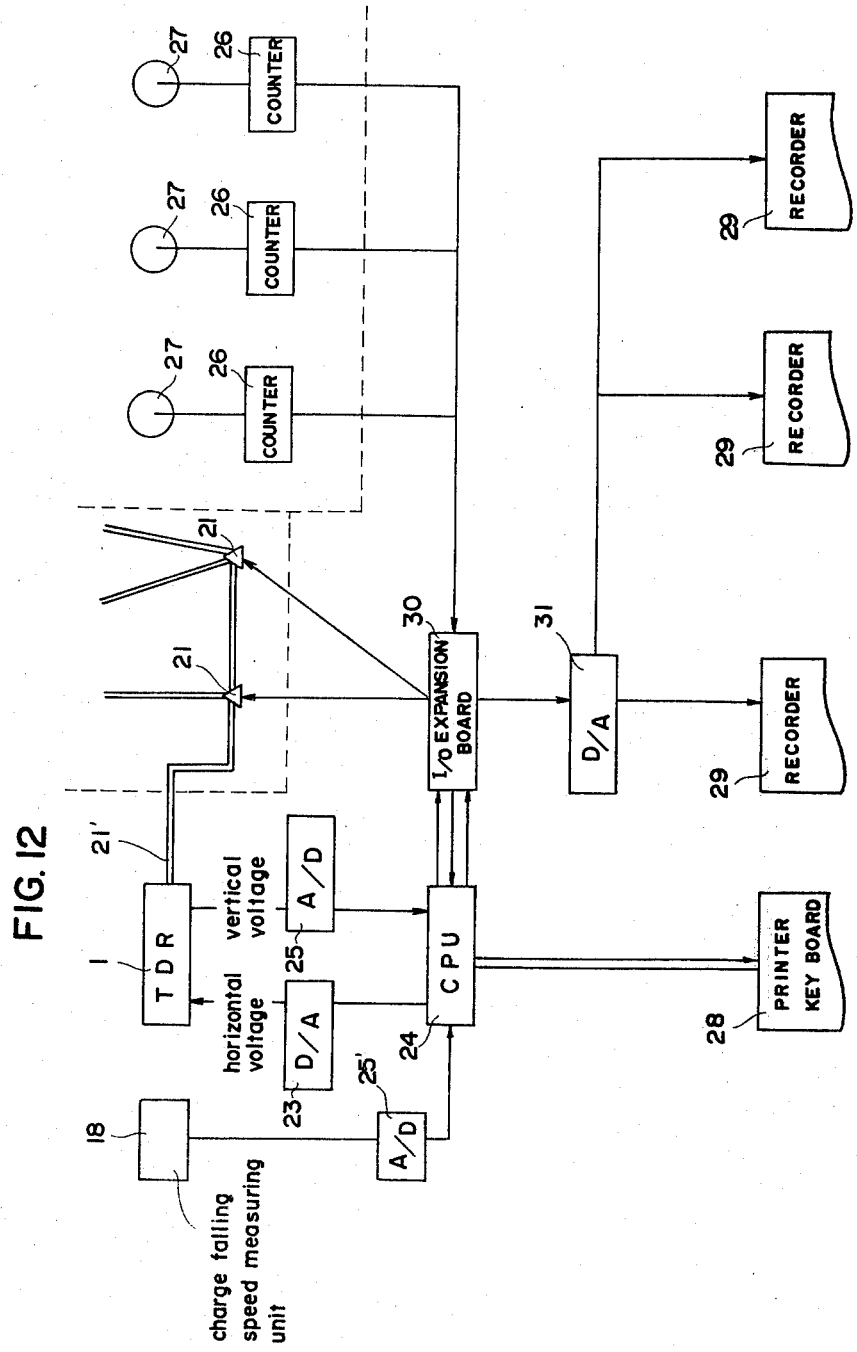

(Open-circuit)

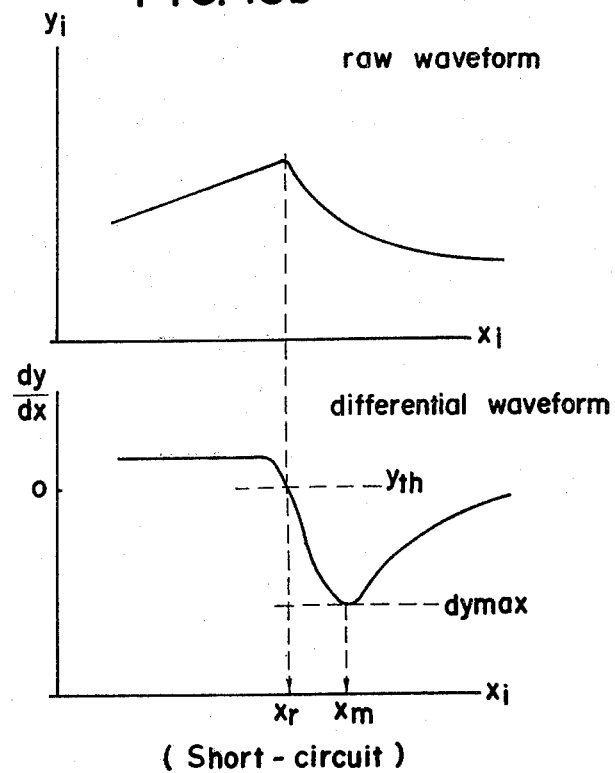
FIG. 13b (Short-circuit)
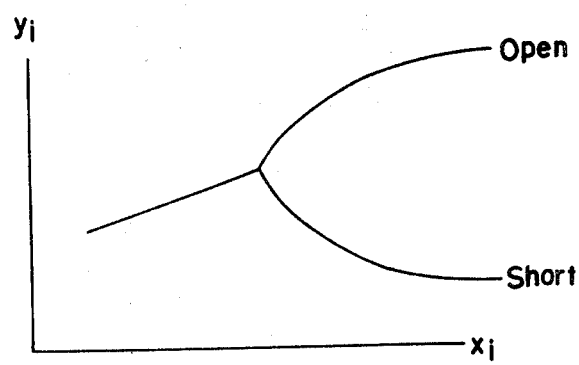
FIG. 14

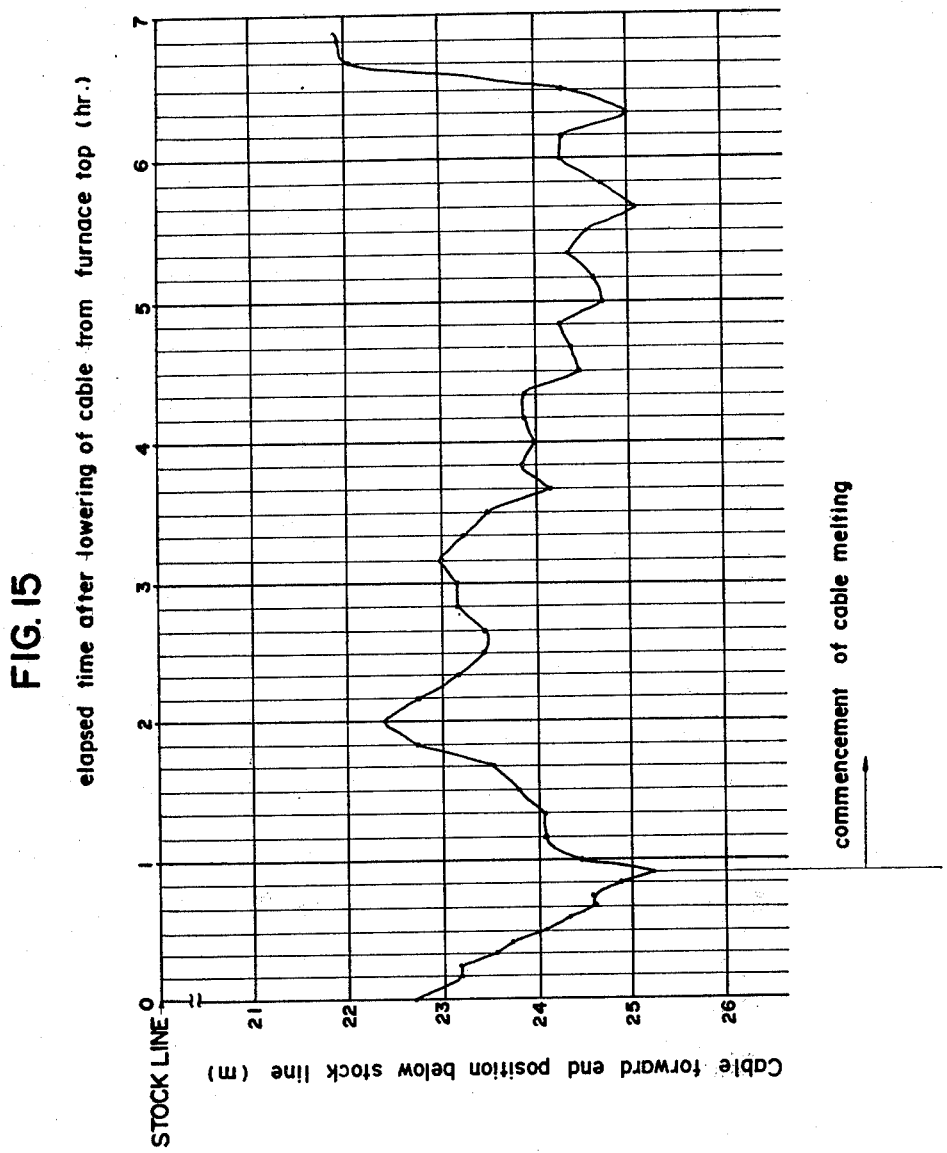

METHOD AND APPARATUS FOR MEASURING HEIGHT LEVEL OF MELTING ZONE IN BLAST FURNACE

BACKGROUND OF THE INVENTION

The present invention relates to method and apparatus for measuring the height position of the melting zone in a blast furnace, and more particularly the invention relates to a method and apparatus designed so that the height level of the upper boundary of a melting zone inside a furnace is measured from the result of an electric measurement of the length of a cable drawn into the furnace from its top and such measurement of the upper boundary height level is accomplished at a plurality of locations continuously over a long period of time during the operation of the furnace so as to more accurately grasp the thermal conditions within the furnace.

During the operation of a blast furnace, in the high temperature area (1000° to 1500° C.) extending from the shaft lower part to the belly and the bosh of the blast furnace is produced a so-called melting zone in which the softening, fusing and dropping of the ores proceed. The recently conducted overhaul investigations of blast furnaces, etc., have shown that since the ore layer and the coke layer exist in the stratified form in the melting zone, the distributed configuration of the layers has an important effect on the distribution of the gas flow in the furnace lower part which is important for the furnace operation and also the height level of the melting zone reflects the thermal conditions of the furnace. For instance, the exemplary furnace conditions reported as the results of the overhaul investigations have shown that in the case of a furnace operated highly efficiently with the fuel ratio of 547 Kg/T.Pig, the melting zone has a sharp inverted V-shape in cross-section (FIG. 1a), and in the case of another blast furnace operated with the low fuel ratio of 470 to 486 Kg/T.Pig the melting zone has a W-shaped cross-sectional shape. Thus it has been proved that there is a close relation between the furnace operation and the position and shape of the melting zone. As a result, to detect and control the level and shape of the melting zone during the operation of a blast furnace is a very important matter for the blast furnace operation since it has the effect of stabilizing the operation and reducing the fuel ratio.

However, since the temperature of the melting zone is high (1000° to 1600° C.), since the inner pressure of recently built large blast furnaces is high (3 to 4 Kg/Cm$^2$) and since the furnace conditions are severe in that the charge is continuously falling and the melting and fusing of the falling ores, etc., are in the advanced stage, it is extremely difficult to actually measure the position and shape of the melting zone. In view of these circumstances, the conditions within the blast furnaces in operation have been investigated by measuring the temperature, pressure, gas composition, etc., with such means as a vertical sonde, horizontal sonde, etc. However, these measurements have been largely confined to the upper sections of the blast furnaces where the temperature is lower than 1000° C. and no continuous measurements have been made in the high temperature areas near the melting zones. This is due to the fact that since the temperature and pressure are high in the vicinity of the melting zone as mentioned previously, since the measurements by a sonde must be made in the severe conditions where the charge is falling continuously and since the measurement by the sonde involves another difficulties such as the difficulty of maintaining and managing the sonde and the measurements being made intermittently inevitably, up to date the conditions of such melting zones have been merely estimated from the measurements of the low temperature areas lower than 1000° C.

In view of the fact that the importance of sensing the level and shape of a melting zone and controlling the same has been recognized recently, reports have been made of methods using a radioisotope (RI) and methods using a tracer gas only for the purpose of measuring the level and shape of a melting zone. The method of using a solid RI is such that the solid RI is introduced, along with the charge, into a desired location of a furnace from its top and the position of the RI or the position of the melting zone is estimated from the time interval between the time that the RI falling along with the charge is melted in the melting zone and the time that the melted RI is tapped along with the molten metal. However, this method is disadvantageous in that measurements must inevitably be made intermittently in view of the nature of its measuring method and that there is a tendency toward causing an error in the estimation of the time interval between the melting and tapping of the RI. On the other hand, the method of using a tracer gas is designed so that a capsule having a tracer gas sealed therein is introduced into a furnace in the like manner as in the case of the solid RI so that the tracer gas released by the melting of the capsule is moved upward along with the furnace gas and the tracer gas is sensed at the furnace top, thereby estimating the position of the melting from the falling speed of the charge. While this method has the effect of improving the accuracy in estimation of the melting level due to the fact that the time interval between the melting of the capsule and the sensing of the tracer gas can be ignored, the method still appears to be disadvantageous in that the tracer gas is diluted by the large amount of the furnace gas thus giving rise to a difficulty from the standpoint of tracer gas sensing accuracy or a difficulty in terms of the material for the capsule itself, and there has been no examples of the actual use in industrial applications. In addition to these methods, several methods of estimating the level and shape of a melting zone have been proposed in which the estimation is made by means of a model calculation on the basis of the measured values of a pressure gage, temperature indicator, gas analyzer, etc., which are installed in the furnace body. However, there has been no actual case in which the accuracy of the level and shape estimated in this way was proved in comparison with the actual measurements and the measurements were no more than the results of mere estimation. Thus, up to date there has been no method capable of directly and continuously measuring the level and shape of a melting zone in a blast furnace for the purpose of detecting the same. It will thus be seen from the foregoing that despite the great importance of grasping the level and shape of a melting zone, no effective measuring method has been developed as yet. Thus, there has existed a need for a melting zone measuring method so designed that (i) it is capable of continuously measuring the position and shape of a melting zone over a long period of time, and (ii) it is possible to make measurements stably with a high degree of accuracy and it is also possible to directly measure the melting zone.

SUMMARY OF THE INVENTION

The present invention has been created to meet these requirements. Thus, it is a principal object of the present invention to provide a method capable of continuously and directly measuring the level and shape of a melting zone in a blast furnace during its operation and an automatic measuring apparatus for automatically effecting the required measurement and data processing.

It is another object of the invention to provide such method and apparatus capable of making a continuous measurement without disturbing the distribution of the charge within the blast furnace during the measurement.

It is still another object of the invention to provide such method and apparatus employing no precision component such as a sonde or radioisotope which is to be inserted into a blast furnace for measuring purposes.

In accordance with one form of the present invention, a plurality of cables each having an electrically opened forward end are continuously inserted into a blast furnace from its top and the cables are drawn into the lower part of the furnace along with the falling of the charge inside the furnace. When the forward ends of the cables reach the top level of the melting zone within the furnace, the cable forward ends are melted and the ends are shorted electrically. A voltage pulse having a sharp rise characteristic is applied to each of the cables and the pulse travels toward the melted end. The traveling pulse causes a reflection at the melted end and the reflected wave travels back at a velocity determined by the electric characteristics of the cable in the opposite direction to the traveling pulse. The time interval between the application of the voltage pulse and the reception of the reflected wave is measured at the base of the cable or the position on the furnace top side and the length of the cable to the melted forward end is measured. The temperature distribution and the charge falling speed within the furnace and the cable drawing speed (cable feed rate) are separately measured so that the cable length is corrected for the effect of temperature in accordance with the measurement of the furnace temperature distribution and the cable length is also corrected for the effect of the deflection of the cable within the furnace in accordance with the measurements of the charge falling speed and the cable feed rate. These measurements and corrections of the cable length are carried out continuously every moment and in this way the height level of the melting zone top within the furnace is measured at a radial location of the furnace from instant to instant. By simultaneously making such measurement at a plurality of radial locations inside the furnace and by gathering the measured results, it is possible to measure changes in the top shape of the furnace melting zone from moment to moment.

The materials for the cable conductors used with the invention are selected in such way that if the furnace charge to be melted consists for example of raw materials for making iron, materials are used whose melting points correspond to that of iron ore.

The above and other object, construction and effect of the present invention will become more readily apparent from the following detailed description taken in conjunction with the accompanying drawings.

BRIEF DESCRIPTION OF THE DRAWINGS

FIG. 4b is a cross-sectional view of FIG. 4a.

FIGS. 6a, 6b and 6c are graphs showing the relationship between the furnace cable length (ordinate) and the elapsed time (abscissa) during the measurement of the melting level at the respective radial positions of South side, furnace center and North side of the furnace.

FIG. 8 is a partial detailed diagram of FIG. 7a.

FIG. 12 is a block diagram showing by way of example an automatic measuring system according to the invention.

FIGS. 13a and 13b are waveform diagrams useful for explaining an inflection point recognizing algorithms.

FIG. 14 is a diagram for explaining the waveform variation due to the terminal resistances of the cable.

FIG. 15 is a graph showing by way of example the actual measurements of the elapsed time (abscissa) after lowering of the cable from the furnace top and the cable forward end position (ordinate).

DESCRIPTION OF THE PREFERRED EMBODIMENTS

Figure 2:
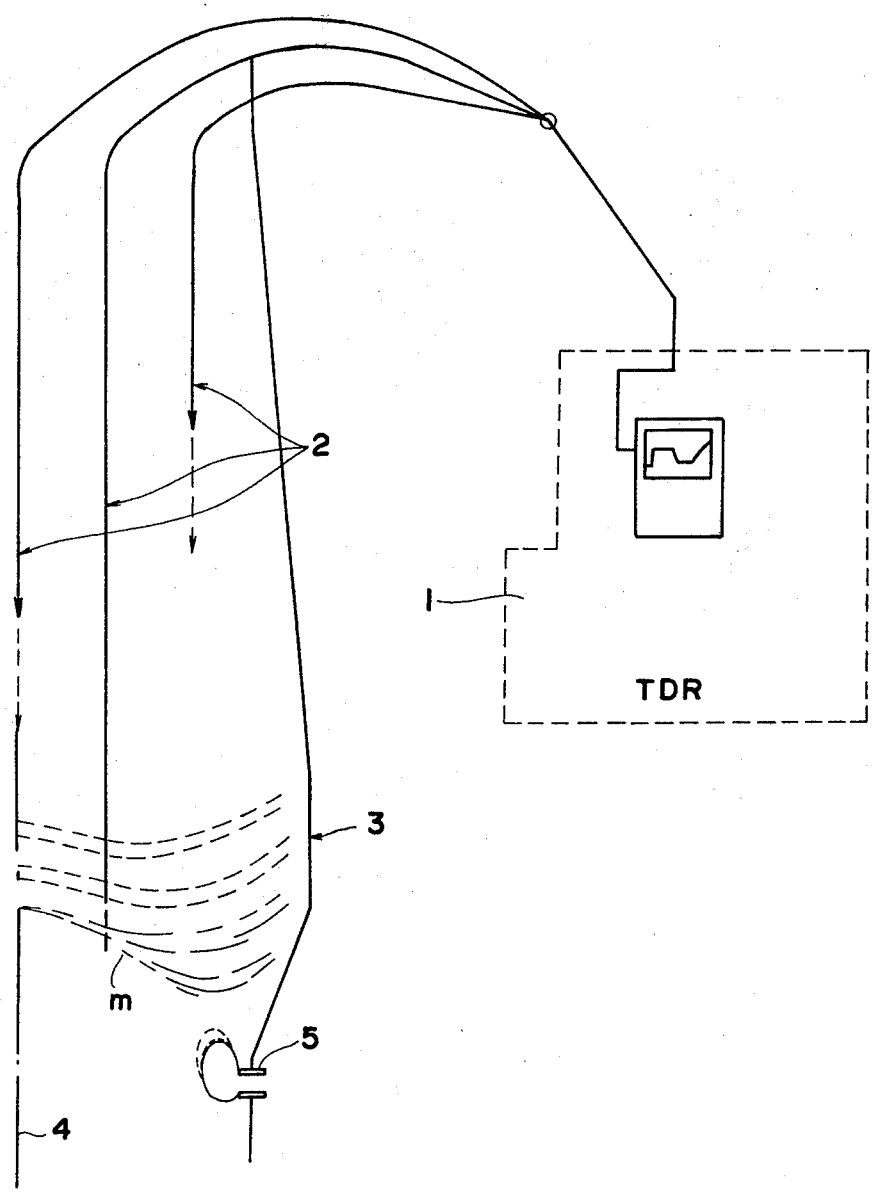
FIG. 2 is a schematic diagram showing an embodiment of a method according to the present invention.
Figure 3A:
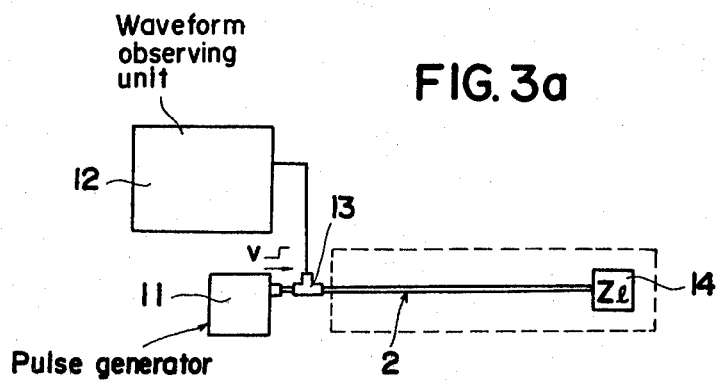
FIG. 3a is a block diagram useful for explaining the principle of pulse generation and detection according to a TDR method.
Figure 3B:
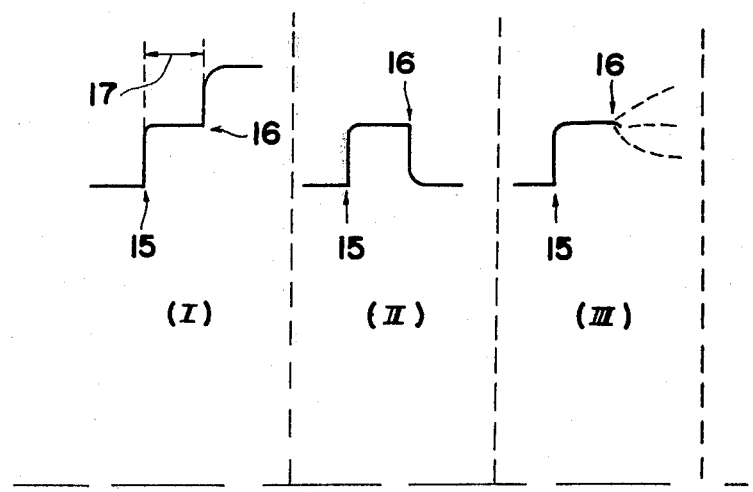
FIG. 3b is a diagram showing by way of example the response waveform from the forward end of a cable.

Referring first to FIG. 2 illustrating a schematic diagram for explaining the method of this invention, numeral 3 designates a blast furnace in operation, 4 the position of the furnace center line, 5 a tuyere, and m the melting level. Numeral 2 designates measuring cables each consisting of a coaxial or multi-core sheathed cable whose coated layers and core wire will be melted in the temperature range of 1200° to 1600° C. as will be described in detail later. While the Figure shows the case in which the plurality of cables 2 are lowered from the upper part of the blast furnace into the desired positions within the furnace, it is needless to say that there are cases where the single cable 2 is used. Numeral 1 designates a unit for generating a pulse voltage having a sharp rise and detecting the reflected wave having a sharp rise and detecting the reflected wave of the pulse voltage to thereby measure the length of the cables. The unit 1 may use for example the TDR (time domain reflectometer) method which measures the time response of a reflected wave produced by the application of a voltage pulse. This TDR method has been developed as a means of studying the relationship between a transmission line and its load in accordance with the distributed constant circuit characteristics. FIG. 3a shows an example of application of the method to the measurement of the length of a cable and the measurement is accomplished by means of a pulse voltage generator 11, a waveform observing unit 12 and voltage distributor or directional coupler 13 in the manner that will be described hereunder. In the Figure, numeral 2 designates a measuring transmission line corresponding to the measuring cable of the present invention. Numeral 14 designates an impedance Zl to be measured which corresponds to the electric impedance at the forward end of the measuring cable of this invention. FIG. 3b shows the reflected waveform resulting from the pulse voltage from the generator 11. In FIG. 3b, the waveform I is one produced by a cable having its forward end opened electrically, the waveform II is one produced by a cable having its forward end shorted by the adhesion of a conductor such as molten iron to the forward end, and the waveform III is one produced by a cable having a semiconductor such as slag adhered to its forward end. Numerals 15, 16 and 17 designate time elements respectively corresponding to the cable rear end position, the cable forward end position and the cable length. The step voltage generated from the pulse voltage generator 11 travels along the measuring cable 2 so that if the measuring cable 2 includes any mismatched portion, a part of the traveling step voltage is reflected at the mismatched portion and a composite wave of the traveling wave and the reflected wave appears at the waveform observing unit 12. If $V_p$ represents the velocity of the voltage waveform propagating along the measuring cable 2 and $\xi$ represents the dielectric constant of the medium between the lines of the measuring cable 2, then the following equation holds $$V_p = \frac{V_c}{\sqrt{\epsilon}}$$

Where $V_c$ is the velocity of light. On the other hand, if L represents the length of the measuring cable 2 from the end to the mismatched portion and T represents the time required for the traveling wave reflected at the mismatched portion to return to the observing point, then the waveform observation gives $L = V_p T/2$.

Figure 4A:
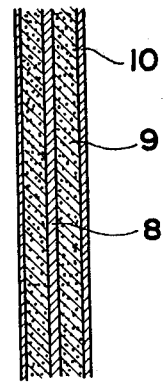
FIG. 4a is a longitudinal sectional view showing by way of example a cable used with the invention.
Figure 4B:
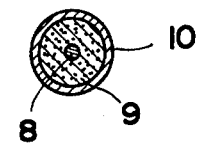

In accordance with the present invention, the length of the measuring cable 2 from its rear end to its forward end (or the melting end) is measured from the pulse width 17 in accordance with the above-mentioned principle. FIG. 4 shows one form of the measuring cable (the coaxial cable having a single core wire), and in the Figure numeral 8 designates a core wire, 9 an insulating material, and 10 a sheath conductor. In accordance with the present invention, the following three requirements must be considered in selecting the materials for the cable.

(1) The cable conductors are meltable at around the temperature of the melting zone (1200° to 1600° C.).

(2) The cable has a sufficient strength such that it can be lowered, along the charge, to the melting zone in the furnace from the furnace top.

(3) The electric loss of the cable as a transmission circuit is small.

Thus, while a nichrome wire (SUS 316) is used for the core wire 8, MgO for the insulating material 9 and nickel chrome steel (SUS 316) for the sheath conductor 10, it is important to use materials having the same effects as those mentioned. The suitable materials for the core wire and the sheath conductor include stainless steel, nichrome, nickel, Inconel, etc., and the suitable materials for the insulating material include MgO, $Al_2O_3$, $SiO_2$, etc. As regards the form of the cable, multi-core cables having two or more cores or coaxial cables may be used. The diameter of the core wire may for example be in the range of 4 to 30 mm$\phi$, and the range of desired relationship between the core wire diameter and the sheath inner diameter is such that any values can be selected so far as the electric loss of the cable has no detrimental effect on the measurement of the position of the melted cable end by the waveform detecting unit.

In accordance with the method of this invention, as previously described in connection with FIG. 2, the measuring cable 2 constructed as described above is inserted into a blast furnace from its upper part in such a manner that the cable 2 is lowered at a desired position in the horizontal plane within the furnace, and in this way the cable 2 is drawn, along with the charge, into the furnace by the pulling force of the falling charge. When the forward end of the cable reaches the melting zone, the cable forward end is melted. The length of the cable from its base to the melted end is measured by the unit 1 adapted to detect the cable by means of the reflection of the pulse which was described in detail with reference to FIG. 3 and in this way the overall cable length within the furnace is obtained. This overall length is corrected for the deflection of the cable within the furnace in accordance with the falling speed of the charge and the feeding rate of the cable in the manner that will be described later, thus determining the distance to the cable forward end or the height level of the melting zone. In addition, since the cable is lowered at the desired position in the horizontal plane inside the furnace as mentioned previously, it is possible to determine the three-dimensional configuration of the upper boundary of the melting zone in accordance with the values measured by a plurality of the similar cables. Further, since the cables are lowered continuously, by making the measurement continuously, it is possible to detect the level and shape of the melting zone continuously in time.

Figure 5B:
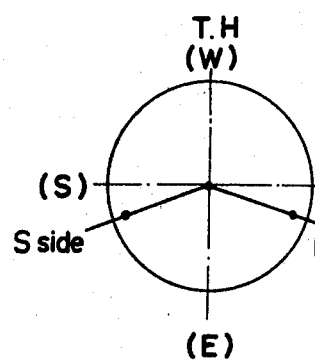
FIG. 5b is a plan view showing by way of example the cable inserting positions at the furnace top.
Figure 5A:
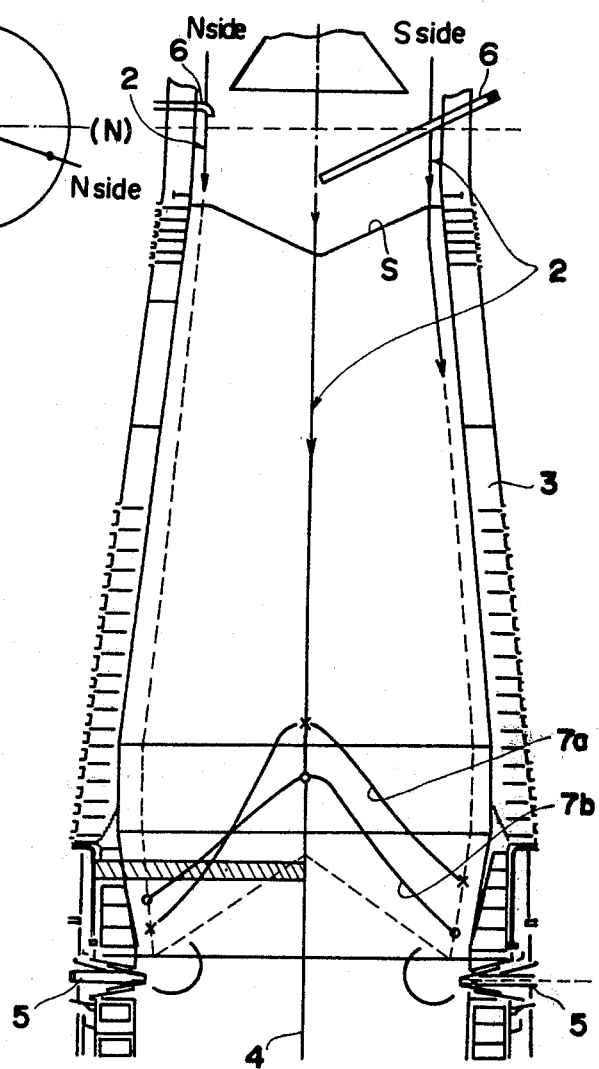
FIG. 5a is a schematic longitudinal sectional view showing the results of the measurement of the level and shape of the melting zone within the furnace.

FIGS. 5 and 6 show the results of the measurement of the level and shape of the melting zone which was effected by the method of the invention in the No. 1 blast furnace of the Mizue Works, Nippon Kokan Kabushiki Kaisha. FIG. 5a is a schematic sectional view showing the results of measurement of the melting zone in the above-mentioned blast furnace, and FIG. 5b is a plan view showing the cable inserting positions at the furnace top. In the Figures, numeral 2 designates cable, 3 a furnace shell, 4 a shell center line, 5 tuyeres, 6 cable inserting lances, and 7a and 7b melting zones. The measurement results of FIGS. 5 and 6 will now be described. The cables were lowered at the three-diametrical positions indicated by the black spots in FIG. 5b (the two peripheral positions on the S and N sides and the single center position) and the height level of the melting zone was measured by the cables. In FIGS. 6a, 6b and 6c, the solid lines show the variations with time of the overall cable lengths within the furnace and the dotted lines show the overall cable lengths or melting levels which were corrected for the deflections of the cables within the furnace in accordance with the falling speed of the charge and the cable feeding rate. FIG. 5a shows the average values of the measured positions of FIGS. 6a, 6b and 6c which were plotted on the furnace profile of the previously mentioned No. 1 blast furnace at Mizue Works, and the Figure clearly shows the level and shape of the melting zones. In FIG. 5a, the melting zone curve 7a indicated by the "X" marks shows the measurement results obtained with the coaxial cables each having a sheath outer diameter of 6.4 mm$\phi$, a sheath thickness of 0.6 mm and a core wire diameter of 1.27 mm$\phi$, and the melting zone curve 7b indicated by "O" marks shows the measurement results obtained by using the coaxial cables each having a sheath outer diameter of 8.0 mm$\phi$, a sheath thickness of 0.74 mm and a core wire diameter of 1.27 mm$\phi$. In the both cases, the coaxial cables comprised the insulating material of MgO, the sheath material of SUS 316 and the core wire material of SUS 316 and nichrome.

The method of this invention has been described and the method has the following advantages.

(a) The level of a melting zone can be directly and continuously measured.

(b) By lowering a cable to each of a plurality of diametrical points within a blast furnace, it is possible to continuously measure the shape of a melting zone.

(c) Due to the use of the cables of a small diameter, there is no danger of disturbing the distribution of the charge during the lowering of the cables into the furnace.

(d) By using long cables or by joining cables, it is possible to make the measurements continuously over a long period of time.

(e) The range of selection of cables applicable to the method of this invention is wide.

It should be noted that the method of the present invention is not intended to be limited to the measurement of the melting zone in a blast furnace, and the method can be applied for example to the measurement of the melting zone level in a cupola, the measurement of the melting level and shape of electric smelting furnaces, the measurement of the metal level in the vessels such as the level of molten metal in mixers, etc. Further, by changing the materials of the cables so as to suitably determine the melting point of the cables, it is possible to apply the method to the measurement of the melting level in a variety of dry refining furnaces.

Next, a preferred automatic measuring apparatus for performing the method of the present invention will be described.

The apparatus is designed to automatically measure the level and shape of a melting zone within a blast furnace and it employs a TDR (time domain reflectometer) so that the desired measurement and data processing are performed automatically when measuring the level of a melting zone within a blast furnace.

Figures 1A, 1B:
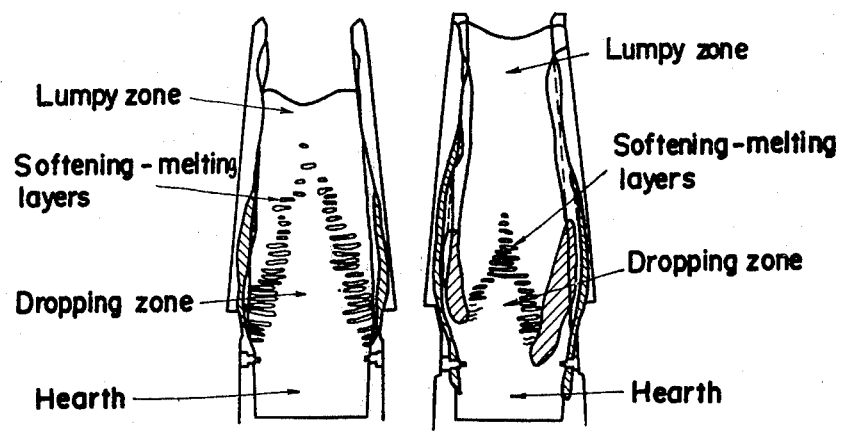
FIGS. 1a and 1b are schematic diagrams each showing by way of example the distribution of a melting zone within a blast furnace.

As already explained with reference to FIGS. 1a and 1b, the results of the overhaul investigations of the blast furnaces, etc., have shown that there is a close correlation between the level and shape of a melting zone in a blast furnace and the operating conditions of the furnace. However, with the known measuring techniques, it has been impossible to lower a sensor to near the melting zone in a furnace for direct measurement of the melting zone, and it has also been impossible to measure the melting zone continuously over a long period of time. In view of these circumstances, in accordance with the present invention a method has been developed in which a plurality of sheathed cables are lowered into a blast furnace from its upper part or the furnace top and the overall lengths of the cables are measured by the TDR method, thus detecting the positions of the melted cable forward ends from the measured cable lengths and thereby determining the level and shape of the melting zone. This method makes it possible to directly and continuously measure the melting zone over a long period of time. Since much labor and time will be required if the measurement is effected manually, a system has been developed in which the measuring system is automated and the analysis and indication of data are automatically effected by means of a microcomputer, thus decreasing the labor and improving the accuracy of measurement.

Figure 7A:
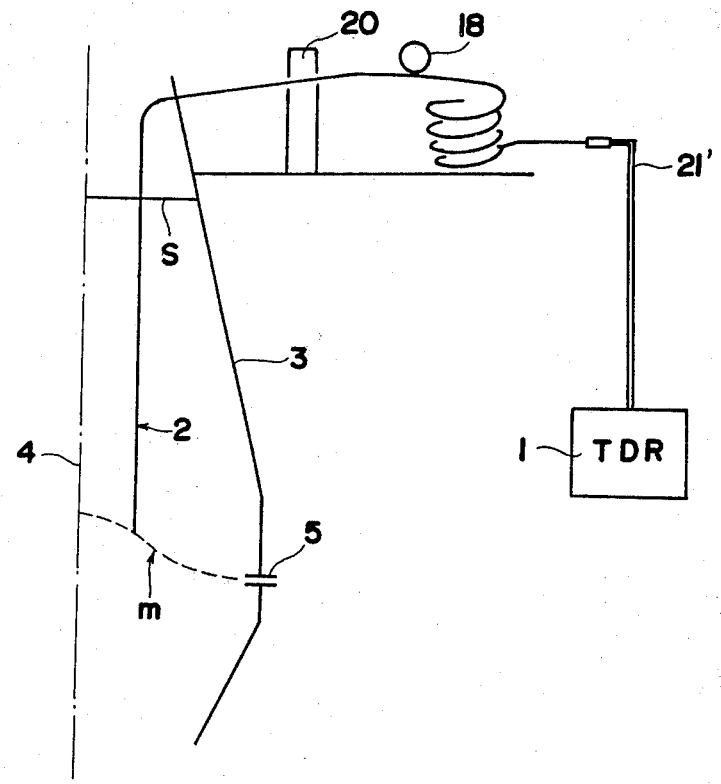
FIG. 7a shows schematically the construction of a cable feed measuring unit and a voltage pulse supply unit, respectively, which are used with the invention.
Figure 7B:
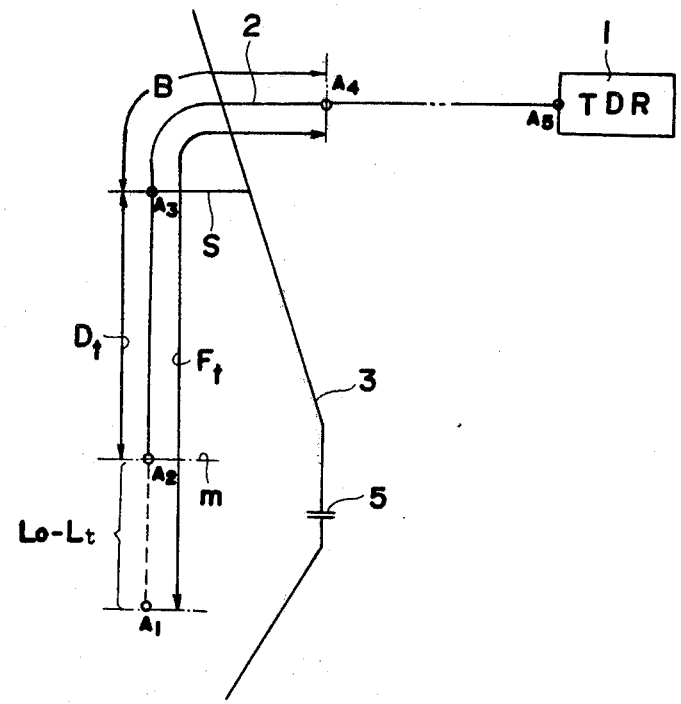
FIG. 7b is a diagram for explaining the principle of calculating the position of the cable forward end.
Figure 8:
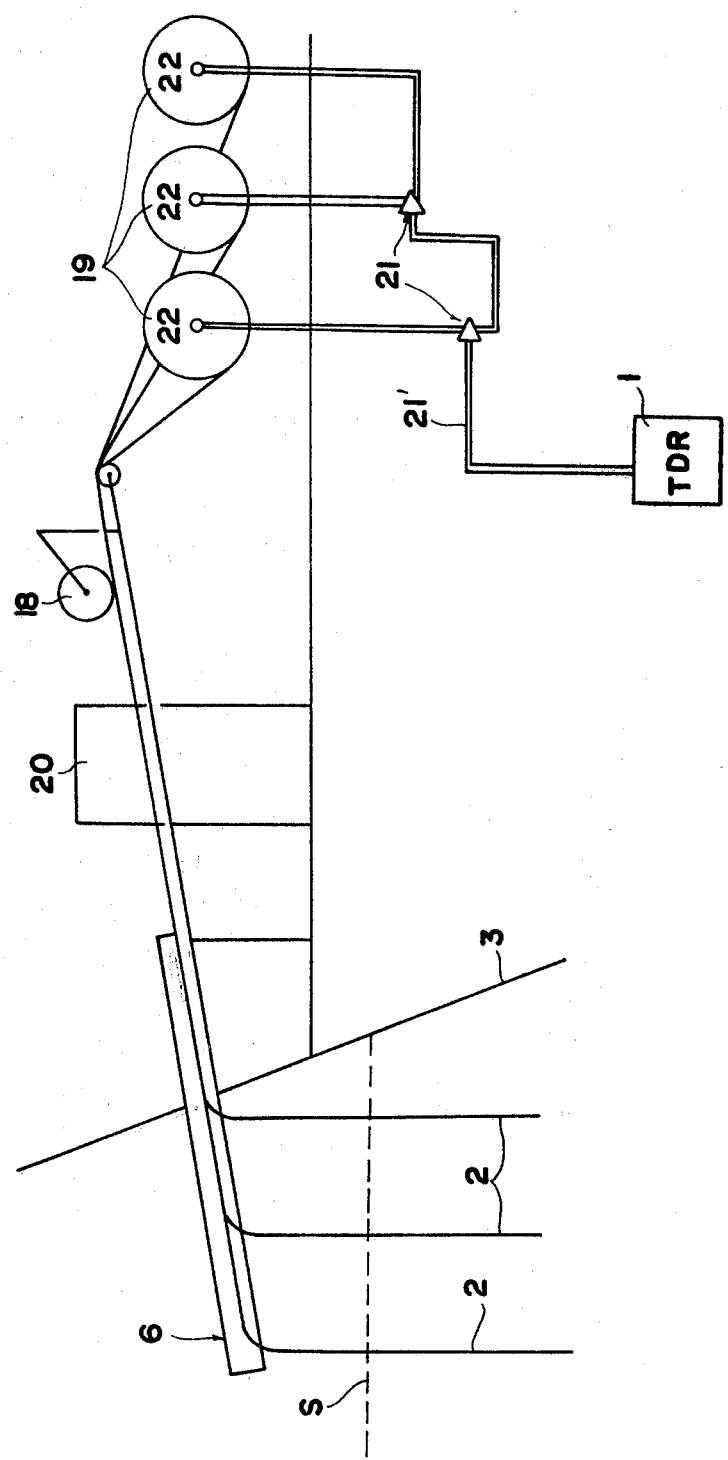

The measuring apparatus according to the invention will now be described with reference to the drawings. FIGS. 7a and 7b are schematic diagrams showing a cable feed measuring unit, a charge falling speed measuring unit and a voltage pulse supply unit, and FIG. 8 is a partial detailed view of FIGS. 7a and 7b. In the Figures, numeral 1 designates a unit for detecting the reflected response of a pulse to measure the length of a cable as described with reference to FIG. 2. Numeral 2 designates sheathed cables of the type as shown in FIG. 4, 3 a blast furnace, 4 the center line of the furnace, 5 a tuyere, m a melting zone, S a stock line, 18 a measuring roll, 19 cable drums, 20 a cable feeder, 6 lances, 21 coaxial cable selectors, 21' a coaxial cable, 22 rotary connectors. The function of the apparatus will be described first. The sheathed cables 2 are lowered into the blast furnace 3 from its top by way of the lances 6 such as shown in FIG. 8, and the lances 6 are freely movable in the circumferential direction and the diametrical direction of the furnaces so as to change the position of their forward ends, thus allowing the cables 2 to be lowered at any desired positions in the furnace. The cable feed measuring unit 20 measures the total amount of the cable length fed and the cable inserting speed at regular intervals. When each of the cables 2 lowered in this way comes near to the melting zone, the cable 2 starts to melt. As a result, by selecting the suitable materials for the sheath and the core wire of the cable 2 so that their melting points become equal to that of the ore, it is possible to cause the cable 2 to start melting as soon as it reaches the melting zone m. Also there are cases where the cable is caused to deflect due to the difference in speed between the falling speed of the charge and the inserting speed of the cable within the furnace and consequently the charge falling speed measuring unit 18' measures the falling speed of the charge at the regular intervals for correcting the cable length for the deflection. This charge falling speed measuring unit 18' may by any of the previously mentioned utilization of RI and other length measuring devices which are usually used in the operation of blast furnaces. Once the length of the cable 2 to the forward end has been obtained in this way, it is possible to determine the position of the forward end or the level of the melting zone m from the following equation.

In other words, if, in FIG. 7, Dt represents $A_2$-$A_3$ (the length from below the stock line to the forward end), Ft represents $A_1$-$A_4$ (the total length of the cable fed by a time t), B represents $A_3$-$A_4$ (the length from above the stock line to the feed length measuring unit) and $L_o$-$L_t$ represents $A_1$-$A_2$ (the lost length due to melting), then the length of the cable 2 to its forward end is given as follows:

$$D_t = (F_t - B) - (L_o - L_t)$$

where $L_o$ is an initial overall cable length value and $L_t$ is the overall cable length at the time t. Since B and $L_o$ are constants, the value of $D_t$ can be obtained by finding the values of $F_t$ and $L_t$. The value of $F_t$ is determined by the cable feed measuring unit 20 and the value of $L_t$ is determined by the cable length detecting unit 1.

On the other hand, since the $D_t$ represents the actual cable length inside the furnace, in order to determine a melting zone level $M_t$, it is necessary that (a) a correction is made for a measurement error due to a variation in the cable electrical characteristic caused by the temperature distribution within the furnace and that (b) a correction is made for the deflection of the cable due to the difference in speed between the falling speed of the charge and the inserting speed of the cable. These corrections are made as indicated by the melting zone level estimating logic flow shown in FIG. 9. More specifically, a correction factor $\beta$ is used for the apparent change in the cable length due to the temperature distribution within the furnace (usually on the order of 5% of the actual length in the furnace). Also the cable deflection due to the difference in speed between the cable inserting speed and the charge falling speed is calculated by measuring the falling speed of the charge at the furnace top by the charge falling speed measuring unit 18', obtaining from this measured falling speed a falling speed distribution of the charge at various vertical positions in the furnace on the basis of the shell profile, variation of voids, etc., and finding the difference between it and the corresponding cable inserting speeds in time. By correcting the value of Dt for these factors, the position of the cable forward end or the melting zone level Mt is obtained.

Figure 9:
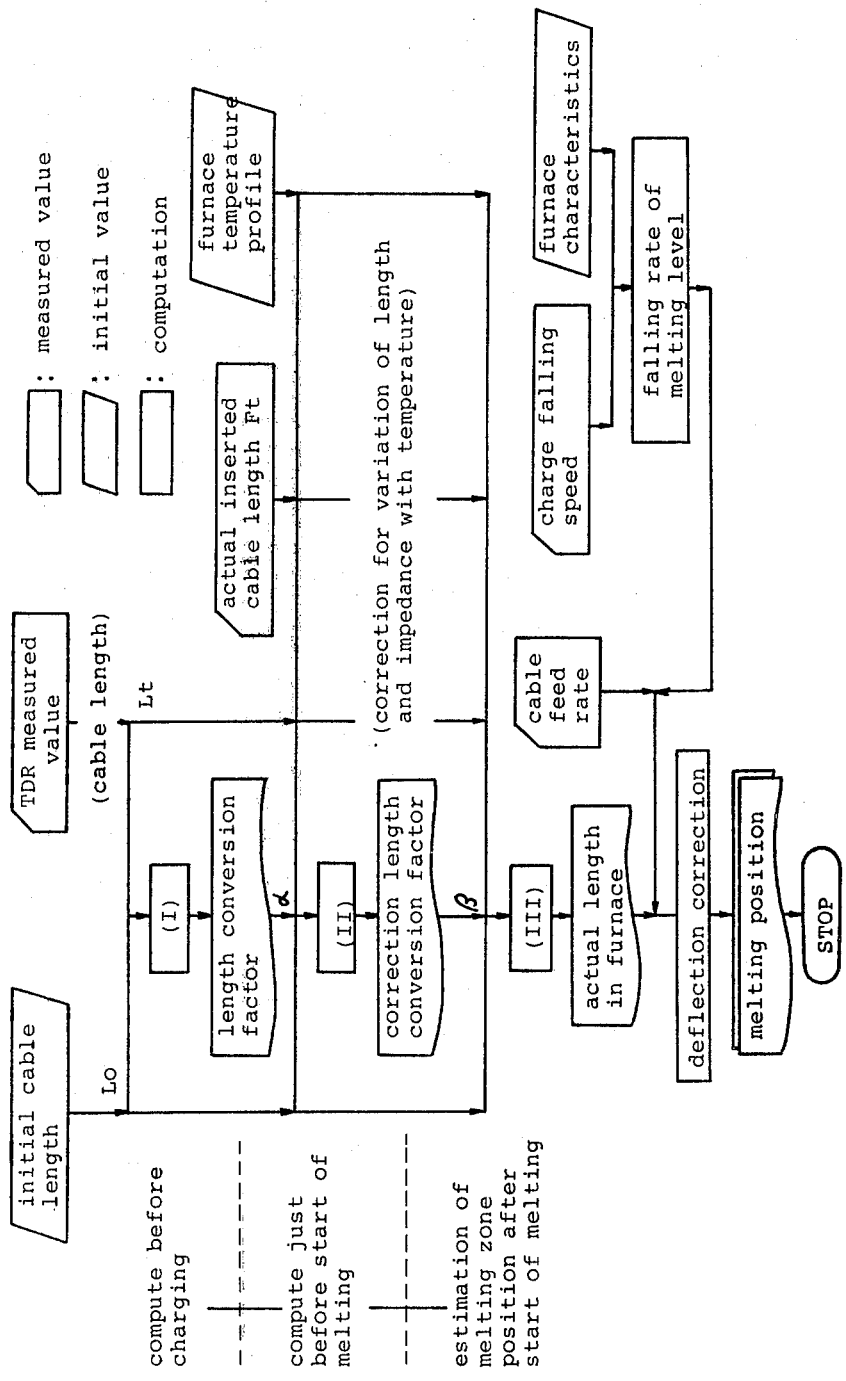
FIG. 9 is a flow chart showing a melting level estimating logic flow.

It is assumed that the calculations of (I), (II) and (III) of FIG. 9 are performed from the following equations.

$$\frac{L_o}{L_t} = \alpha \quad \text{(I)}$$

$$\frac{L_t - (L_o - F_t)}{F_t} = \beta \quad \text{(II)}$$

$$\frac{D_t}{\beta} \quad \text{(III)}$$

Figure 10:
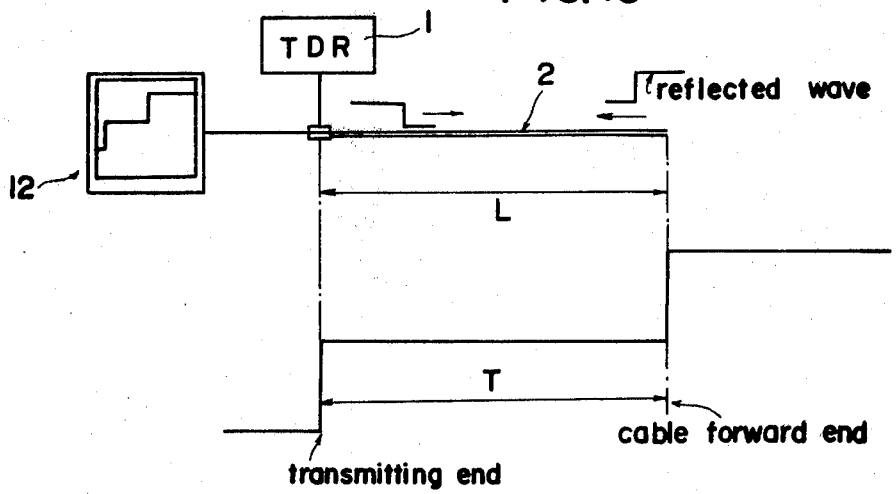
FIG. 10 is a diagram for explaining, with the aid of principal component blocks and voltage waveforms, the detecting principle of the TDR used in the apparatus of this invention.
Figure 11:
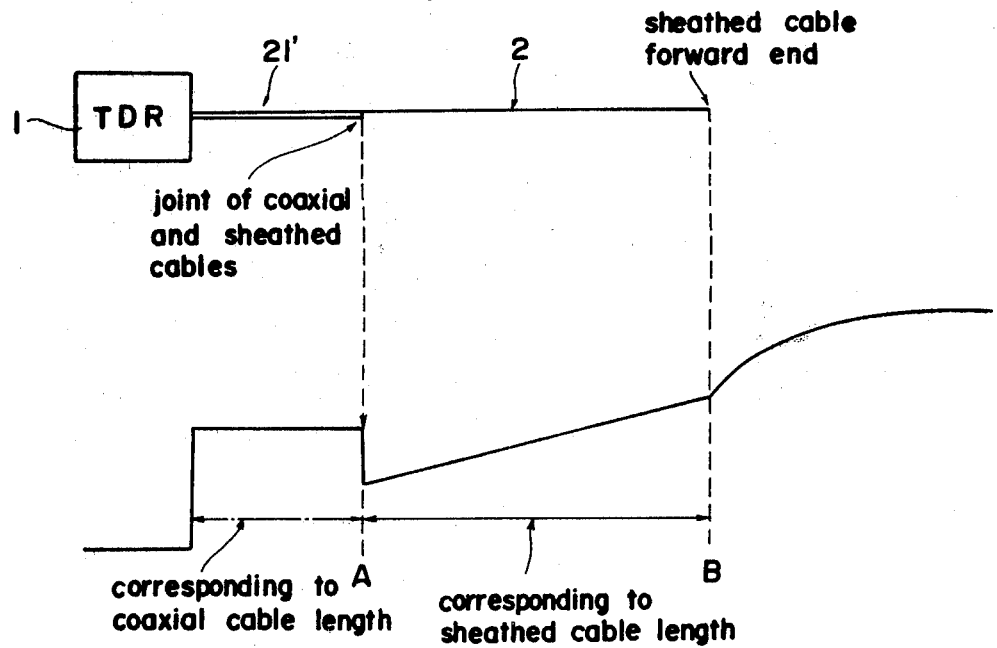
FIG. 11 is a diagram showing a variation of the waveform caused by the connection of an approaching coaxial cable to a measuring sheathed cable.

FIG. 10 is a diagram for explaining the detection of a reflected wave by the TDR unit, and FIG. 11 is a diagram for explaining the waveform produced when a coaxial cable and a sheathed cable are joined together. In the Figures, numeral 1 designates a step voltage (or square-law sinusoidal pulse) generator, 2 a sheathed cable, 12 a synchroscope, and 21' a coaxial cable. In FIG. 10, the step voltage generator or the square-law sinussoidal pulse generator 1 supplies a step voltage to the coaxial cable 21 and samples the resulting reflected wave. The reflection takes place at any portion of the cable where the impedance is mismatched or at the forward end of the cable. By measuring the time interval T between the transmission of the pulse and the arrival of the reflected wave, then there holds $L = V_p T/2$, where $V_p$ is the propagation velocity and L is the length of the cable to the mismatched portion. In the case of the coaxial cable, the propagation velocity $V_p$ is given by $V_c/\sqrt{\epsilon}$ (where $V_c$ is the velocity of light and $\epsilon$ is the dielectric constant of the insulator), and the time interval T is determined by the pulse width of the wave sampled by the synchroscope 12. Thus, the cable length is determined from these $V_p$ and T. In accordance with the apparatus of this invention, the sheathed cable 2 adapted for insertion into the furnace is connected to the approaching coaxial cable 21' of the ordinary type. The resulting reflected wave is shown in FIG. 11. In the Figure, a point A is the joint of the coaxial cable 21' and the sheathed cable 2 (a mismatch of impedance occurs at the joint due to the difference in characteristic impedance) and a point B is the foward end of the sheathed cable 2. Thus, the pulse width A-B corresponds to the sheathed cable length and it is possible to obtain the cable length $L_t$ by measuring the pulse width. On the other hand, the amount of cable feed $F_t$ is obtained by the measuring roll 18 of the cable feed measuring unit 20 to determine the melting zone level Dt.

Next, a specific embodiment of the apparatus of this invention will be described.

(i) The form of cables is the same coaxial type as shown in FIG. 4 comprising a core wire and a sheath which are made from SUS 316 and an insulating material of MgO.

(ii) The cables are taken on the cable drums 19 so that the cables are fed out as the cables are lowered into the blast furnace. The cable drums are each provided with a rotary connector 22 so as to transmit an electric signal and serve a function of preventing any twisting of the cable due to the drum rotation.

(iii) The cable is lowered at each of a plurality of radial points of the furnace simultaneously so as to obtain a diametrical distribution of the melting zone. The coaxial cable selectors 21 are connected to the coaxial cables so that by selectively operating the selectors 21, it is possible to sequentially measure the length of a plurality of the cables by the single TDR unit.

(iv) The cable feeder 20 is provided so that the lowering of the cables is not simply relied on the pulling force of the falling charge but the adjustment of feed rate and the control of tension are also performed so as to conform the lowering of the cables with the falling of the charge.

(v) The amounts of feed of the cables are measured by the measuring roll 18.

In this connection, there have been no cases where the conventional TDR is used for measuring the furnace conditions as in the case of the present invention and it has been the practice to read the waveform on the synchroscope from its scale or the measurement is made by man from the dial reading of the marker. However, when considered from the standpoint of time, these measuring methods require at least whole day for every measurement and considerable labor will be required for observing the readings of the synchroscope at regular intervals during the whole day. In addition, there are considerable variations in the recognition of a positive-going transition among different persons observing the screen. There are still another difficulties in the observation of furnace conditions in that the feed length measurement requires stationing of a person near the furnace top thus requiring consideration for the possible danger on the person due to the poisonous nature of CO gas, etc.

In view of these circumstances, the present invention uses a system for automatically effecting these measurements by means of a computer. FIG. 12 shows the construction of this system. In the Figure, numeral 1 designates TDR unit, 21' an approaching coaxial cable, 21 coaxial cable selectors, 23 a digital/analog converter, 24 a CPU or central processing unit, 25 an analog/digital converter, 26 counters, 27 length measuring devices, 28 a printer key board, 29 recorders, 30 an I/O expansion board, and 31 a digital/analog converter. The TDR automatic measuring system according to the invention will now be described with reference to its individual functions.

(A) Waveform storing section:

Instead of the horizontal sweep voltage of the TDR, a horizontal voltage is applied from the CPU 24 through the D/A converter 23 and the resulting vertical voltage is stored in the memory through the A/D converter 25. By gradually increasing the voltage applied through the D/A converter, it is possible to store the entire waveform in the memory.

Figure 13A:
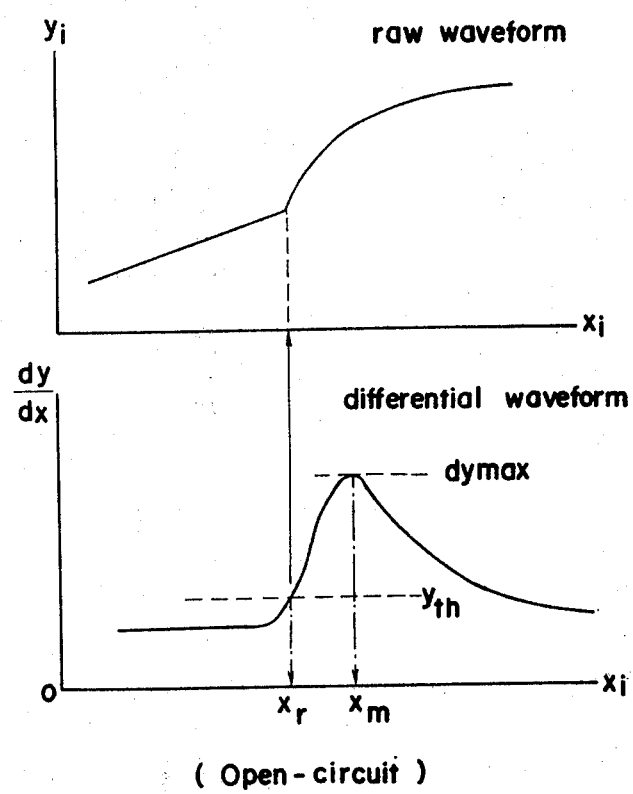

(B) Recognition of inflection point:

The inflection point is determined by analizing the store waveform in accordance with an algorithm designed for obtaining the positions of the melted forward ends of the cables. This principle is shown in FIGS. 13a and 13b. FIG. 13a shows the open-circuit waveform and FIG. 13b shows the short-circuit waveform.

Step 1: Assuming the horizontal addresses xi and the vertical addresses yi of the waveform, then the differentials $$\frac{dyi}{dxi} = \frac{Yi+1 - Yi}{Xi+1 - Xi}$$

are computed and the maximum absolute value dymax = |dym/dxm| and its horizontal address $x_m$ are obtained.

Step II: A threshold value Yth is obtained. This is given by Yth = $\alpha'$.dym/dxm + $\beta'$, where $\alpha'$ and $\beta'$ are predetermined constants.

Step III: Search is made for xm$_1$, xm$_2$, ... from xm to obtain Yr which is |Yr| < |Yth| so that its horizontal address xr becomes a point of inflection.

By using such an algorithm, it is possible to recognize a point of inflection.

In the actual operation, any molten substance such as pig iron may stick to the forward end of the sheathed cable causing a short-circuit waveform, whereas if there is no sticking of such substance an open-circuit waveform will be produced. FIG. 14 shows these waveforms. With the algorithm described, the desired inflection point can be recognized at the same position irrespective of such inversion of the waveform or the positive or negative magnitude of the maximum value of the differentials.

(C) In this way, the desired pulse width or the length of the sheathed cable is determined. In addition, the measured value of the charge falling speed measuring unit 18' and the value measured by the feed length measuring unit 27 and stored by the counter 26 are applied to the CPU 24 which in turn executes the preliminarily incorporated correction program to determine the level of the melting zone.

(D) The result obtained is supplied to the key board or type writer 28 and the recorder 29.

(E) The CPU 24 supplies a relay drive voltage to the coaxial cable selectors 21 for cable selecting purposes and in this way the measuring cables are selected sequentially.

By virtue of the construction described above, the automatic measuring system of this invention is adapted for automatic measurement. The present system performs its data processing and analysis by means of a microcomputer.

The advantages of the above-described TDR automatic measuring apparatus may be summarized as follows.

(a) It is possible to directly bring sensors near to the melting zone within a blast furnace to measure its level. Also it is possible to continuously measure variations in the level with time and also to determine the diametrical distribution of the melting zone level.

(b) By virtue of the automated measurement realized through the use of a microcomputer, there are the following advantages. (1) Contrary to the prior art apparatus requiring much time and labor for each measurement, the present invention does not require much time and labor, is capable of rapidly obtaining the result of the data processing through the on-line operation and has no need to put the data in order by man. (2) While, admitting differences among individuals, the measuring accuracy in visually reading the images on a synchroscope has been over ±50 cm for every 100 m of cable and over ±30 cm even in the case of the skilled persons, the automatic measuring system of this invention can eliminate any errors due to the characteristics of the synchroscope image, errors due to the measurers, etc., and the accuracy of ±15 cm can be ensured. (3) While every visual measurement requires about 3 minutes including the time required for turning the dial, the automatic measuring system of this invention is capable of performing each processing in about 10 seconds thus reducing the length of the measuring intervals and making it possible to measure the melting zone level more frequently.

FIG. 15 shows by way of example the measured data and the data shows the variations in the melting zone level which were measured at intervals of 10 minutes during several hours after the arrival of the cable at the melting zone level.

We claim:

1. A method of measuring the height level of the top of a melting zone of a charge within a blast furnace, said method comprising the steps of:

Inserting and lowering at least one coaxial or multi-core cable having an electrically opened forward end into said furnace from the top thereof in such a manner that the forward end of said cable reaching the top of said melting zone is melted and said cable is drawn downward continuously along with a charge falling within said furnace;

applying at predetermined intervals a sharp step voltage to said cable from the furnace top side thereof toward said forward end; and measuring a response of a reflected wave from said forward end caused by said step voltage, whereby measuring variation in the length of said cable due to the melting of said cable forward end reaching the top of said melting zone in accordance with the time response of said reflected wave by said step voltage and determining from the result of said measurement the height level of the top of said melting zone.

2. A method according to claim 1, wherein said cable includes conductors made from materials having melting points close to that of the substance in said charge in said blast furnace which is to be melted.

3. A method according to claim 2, wherein said cable conductors are meltable in the temperature range of 1200° to 1600° C.

4. A method according to claim 1, wherein said measurement of variation of cable length is performed for each of a plurality of said cables which are inserted into said furnace at a plurality of radial location thereof so as to measure the three-dimensional shape of said melting zone top from the result of said measurements.

5. A method according to claim 1 further comprising the steps of:
measuring the falling speed of said charge in said furnace;
measuring the rate of feed of said cable due to the drawing thereof; and
correcting said measured cable length variation value for the amount of deflection of said cable within said furnace in accordance with said measured charge falling speed and cable feed rate.

6. A method according to claim 1 further comprising the steps of:
measuring a vertical temperature distribution within said furnace; and
correcting a measuring error due to variation of the electric characteristic of said cable with temperature in accordance with said measured temperature distribution.

7. An apparatus for measuring the height level of the top of a melting zone of a charge within a blast furnace, said apparatus comprising:
at least one coaxial or multi-core cable including conductors made from materials having melting points close to that of substance in the charge in said furnace which is to be melted, said cable having its forward end opened electrically;
means for inserting and lowering said cable into said furnace from the top thereof at a selected radial location of said furnace;
feed measuring means for measuring the length of feed of said cable drawn downward in said furnace along with the falling of said charge;
cable feed speed measuring means for computing a momentary feed speed of said cable from the feed length thereof;
voltage pulse supply means for applying at predetermined time intervals a sharp step voltage to said cable at the furnace top side thereof;
reflected wave reading means for detecting a time response of a reflected wave produced by said step voltage;
means for measuring the falling speed of said charge within said furnace; and
means for computing the length of said cable to said cable forward end in accordance with the response time of said reflected wave produced by said step voltage and correcting said measured cable length in accordance with said measured values of cable feed length, cable feed speed and falling speed of charge within furnace to thereby measure the length of melting loss and the height level of the melted forward end of said cable at said predetermined intervals.

8. An apparatus according to claim 7, wherein said inserting and lowering means includes a plurality of means for inserting and lowering a plurality of said cables into said furnace from the top thereof at a plurality of selected different radial locations of said furnace, wherein said feed amount measuring means includes a plurality of means each for measuring the feed length of one of said cables, wherein said cable feed speed measuring means includes a plurality of means each for measuring the feed speed of one of said cables, and wherein said apparatus further comprises means for sequentially selecting and connecting said cables to said voltage pulse supply means, said reflected wave reading means and said computing means to use the same in common with said cables.

* * * * *